(12) United States Patent
Charlet et al.

(10) Patent No.: US 10,142,031 B2
(45) Date of Patent: Nov. 27, 2018

(54) APPARATUS, METHOD AND COMPUTER PROGRAM FOR A RECEIVER OF AN OPTICAL SIGNAL

(71) Applicant: Alcatel Lucent, Boulogne Billancourt (FR)

(72) Inventors: Gabriel Charlet, Nozay (FR); Massimiliano Salsi, Nozay (FR)

(73) Assignee: ALCATEL LUCENT, Boulogne-Billancourt (FR)

( * ) Notice: Subject to any disclaimer, the term of this patent is extended or adjusted under 35 U.S.C. 154(b) by 54 days.

(21) Appl. No.: 15/300,328

(22) PCT Filed: Apr. 8, 2015

(86) PCT No.: PCT/EP2015/057583
§ 371 (c)(1),
(2) Date: Sep. 29, 2016

(87) PCT Pub. No.: WO2015/155215
PCT Pub. Date: Oct. 15, 2015

(65) Prior Publication Data
US 2017/0155454 A1    Jun. 1, 2017

(30) Foreign Application Priority Data
Apr. 10, 2014 (EP) ..................... 14305528

(51) Int. Cl.
*H04B 10/61* (2013.01)

(52) U.S. Cl.
CPC .......... *H04B 10/616* (2013.01); *H04B 10/61* (2013.01)

(58) Field of Classification Search
CPC ...... H04B 10/695; H04B 10/69; H04B 10/66; H04B 10/60; H04B 10/6911; H04B 10/616; H04B 10/61
See application file for complete search history.

(56) References Cited

U.S. PATENT DOCUMENTS

| 7,061,409 | B1 | 6/2006 | Jaentti et al. |
| 2010/0028011 | A1 | 2/2010 | Kaneda et al. |
| 2010/0098411 | A1* | 4/2010 | Nakashima ............ H04B 10/60 398/25 |
| 2011/0236025 | A1 | 9/2011 | Wagner et al. |
| 2013/0163988 | A1 | 6/2013 | Krongold et al. |

(Continued)

FOREIGN PATENT DOCUMENTS

| CN | 2012004890 A | 1/2012 |
| CN | 2012108421 A | 8/2012 |
| CN | 103368656 | 10/2013 |

(Continued)

*Primary Examiner* — Ted Wang
(74) *Attorney, Agent, or Firm* — Patti & Malvone Law Group, LLC

(57) ABSTRACT

A technique is provided for a receiver of an optical signal. The technique includes an apparatus that is configured to input digitized samples of the optical signal at a first sampling rate. The apparatus is further configured to filter the digitized samples based on a plurality of filter coefficients to obtain filtered samples of the optical signal at a second sampling rate. The second sampling rate is different from the first sampling rate. The apparatus is further configured to output the filtered samples of the optical signal at the second sampling rate.

14 Claims, 14 Drawing Sheets

(56) References Cited

U.S. PATENT DOCUMENTS

2013/0259490 A1* 10/2013 Malouin ............ H04B 10/6166
398/152

FOREIGN PATENT DOCUMENTS

| EP | 2178228 | 4/2010 |
|----|---------|--------|
| EP | 2645602 | 10/2013 |
| JP | 2010004245 | 1/2010 |
| JP | 2012175581 | 9/2012 |

* cited by examiner

| X | p | q |
|---|---|---|
| 1.1 | 11 | 10 |
| 1.2 | 6 | 5 |
| 1.25 | 5 | 4 |
| 1.3 | 13 | 10 |
| 1.3333 | 4 | 3 |
| 1.4 | 7 | 5 |
| 1.5 | 3 | 2 |
| 1.6 | 8 | 5 |
| 1.7 | 17 | 10 |
| 1.8 | 9 | 5 |
| 1.9 | 19 | 10 |

Fig. 12

APPARATUS, METHOD AND COMPUTER PROGRAM FOR A RECEIVER OF AN OPTICAL SIGNAL

TECHNICAL FIELD

Embodiments relate to an apparatus, a method and a computer program for a receiver of an optical signal, more particularly but not exclusively, to a sampling rate adaptation in an optical receiver.

BACKGROUND

This section introduces aspects that may be helpful in facilitating a better understanding of the invention(s). Accordingly, the statements of this section are to be read in this light and are not to be understood as admissions about what is in the prior art or what is not in the prior art.

Conventional communication systems mostly comprise a backbone part and an access part. For example, a wireless communication network may comprise a Radio Access Network (RAN) part, which establishes and controls wireless access, and a Core Network (CN), through which other networks and other users of the wireless communication network are connected. Another example of a packet data or a packet switched communication network is the communication network established between the servers and routers of the World Wide Web (WWW). With the steady increases of data demand, interfaces and networks are improved to handle the increased load. For wired connections in the network, optical data transmission using fibers is used to enhance the link capacity between such interfaces.

In communications systems, such as systems using optical data transmission, wireless, wireline or powerline communications, digital data values may be transmitted by means of an optical transmission signal. The optical transmission signal is generated by modulating the phase and/or the amplitude of an optical carrier signal, which possesses a carrier frequency, in dependence on the transmitted data values and in accordance with a constellation diagram of a respective Phase-Shift Keying (PSK) modulation or Quadrature Amplitude Modulation (QAM) method. Prominent examples are Binary Phase Shift Keying (BPSK), Quaternary Phase Shift Keying (QPSK), 16 QAM, 64 QAM, etc.

In optical receivers, components, such as, for example, Analog-to-Digital (AD) converters, Digital Signal Processors (DSPs), filter structures, for example, butterfly equalizers, etc., comply with a sampling rate applied to digitize an Optical-to-Electrical (OE) converted signal. For example, a sampling rate of 2 samples per symbol may be used for these components. Generally, the higher the sampling rate the higher an operating frequency of respective processing components and the higher a power consumption of these respective components.

Document US 2011/0236025 A1 describes an apparatus and methods for optimizing the interplay between the sampling rate of an ADC of a receiver system and a bandwidth of analog anti-aliasing filters. The described technology can be used to mitigate aliasing for receiver systems that operate at fractional sampling rates by optimizing a bandwidth of optical and electrical filters included in the receiver systems.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the inventions. Detailed descriptions of a preferred exemplary embodiment adequate to allow those of ordinary skill in the art to make and use the inventive concepts will follow in later sections.

Various embodiments provide an apparatus, a method and a computer program for an optical transceiver. Embodiments may allow a more efficient optical transmission concept using an improved receiver processing. This may be achieved by re-sampling of samples, such that different sampling rates can be used for different components in a signal processing chain of the optical receiver.

Embodiments provide an apparatus for a receiver of an optical signal. The apparatus is operable to input digitized samples of the optical signal at a first sampling rate. The apparatus is further operable to filter the digitized samples based on a plurality of filter coefficients to obtain filtered samples of the optical signal at a second sampling rate. The second sampling rate is different from the first sampling rate. The apparatus is further operable to output the filtered samples of the optical signal at the second sampling rate. Embodiments may enable sampling rate adaptation to processing demands and may therewith enable adaptation of power consumption of processing components to processing demands. For example, an output sampling rate may correspond to one sample per symbol. In some embodiments the second sampling rate is lower than the first sampling rate. In some embodiments a ratio of the first sampling rate to the second rate may differ from an integer, it may correspond to a rational or real number, such as a number between 1 and 2.

Embodiments may therefore enable to lower the sampling rate, processing capacities and power consumption in the signal processing chain of the optical receiver.

The apparatus may, in some embodiments, be operable to adaptively update filter coefficients. Embodiments may enable resampling based on adaptive filtering, which may adaptively update filter coefficients, in order to maintain delays, phase or frequency relations, equalization, interference or error reduction or any other signal property in the processing chain. For example, the apparatus may be operable to adaptively update the filter coefficients based on a constant or multi modulus algorithm. In some embodiments such an algorithm may be applied to adaptively update filter coefficients for equalization, polarization de-multiplexing, polarization mode dispersion (PMD) compensation, residual chromatic dispersion compensation, or retiming. The apparatus may be operable to initialize the filter coefficients based on a constant or multi modulus algorithm and then apply no or other update algorithms subsequently.

In some embodiments the apparatus may be operable to input multiple parallel streams of digitized samples with the first sampling rate based on multiple polarizations and/or modes of the optical signal. That is to say, the input samples may represent multiple modes and/or multiple polarizations of the optical signal. The apparatus may be further operable to de-multiplex filtered samples of different polarizations and/or modes of the optical signal using the plurality of filter coefficients. Hence, embodiments may enable resampling and polarization or mode de-multiplexing in a combined filter structure.

In some embodiments, the apparatus may further comprise an adaptive filter, which is operable to filter the digitized samples at the first sampling rate. The apparatus may be operable to base an updating of coefficients of the adaptive filter on a fraction of output samples of the adaptive filter. The apparatus may further comprise a decimator operable to select samples, which are used for updating the coefficients of the adaptive filter as samples of the filtered samples of the optical signal. The apparatus may further comprise one or more interpolators combined with subsequent decimators operable to determine other samples of the filtered samples of the optical signal. Some embodiments may make use of a synergy between samples selected for adaptive filter updating at the first sampling rate, and samples selected for the filtered optical output signal in that such selections are synchronized or based on the same samples. In other words in some embodiment samples selected from the sample stream with the first sampling rate, which are selected for adaptive filter update, may be used as samples of the output sample stream with the second sampling rate.

For example, the apparatus may be operable to filter the digitized samples using a structure of multiple parallel filters. Each of the multiple parallel filters may be operable to output filtered samples. A sample output rate of one of the multiple parallel filters may be lower than the second sampling rate. Embodiments may hence enable parallelization for operating parallel filter structures with reduced sampling rate.

In further embodiments, two filtered output samples of two of the multiple parallel filters may be time-shifted by a delay. The delay is based on a relation between the first and second sampling rates. Embodiments may enable timing adaptation of re-sampled output samples. The multiple parallel filters may be operable to process a block or group of subsequent digitized samples of the optical signal. A first filter of the two of the multiple parallel filters may correspond to a reference filter outputting a first filtered sample in a block of subsequent filtered samples having the second sampling rate. The block of subsequent filtered samples may correspond to an input block of subsequent digitized samples of the optical signal. A second filter of the two of the multiple parallel filters corresponds to a filter outputting a second filtered sample, $k_{interp}$ samples after the first filtered sample in the block of subsequent filtered samples. The delay is determined relative to a timing of an earliest input sample from the block of subsequent digitized samples of the optical signal, which is used by the second filter of the multiple parallel filters. Said timing may be delayed by $$d_{interp}(k_{interp}) = (k_{interp})/\text{resampling\_rate} - \text{round}((k_{interp})/\text{resampling\_rate}),$$

where $d_{interp}$ corresponds to the delay between the timing of the earliest input sample and the output of the second filtered sample. The resampling-rate corresponds to a ratio of the first and the second sampling rates. Embodiments may provide filtered output samples at the second sampling rate with a timing adapted to the first and second sampling rates.

Moreover, in some embodiments a position $t_{in}$ of the earliest input sample in the block of subsequent digitized samples used by the second filter of the multiple parallel filters may correspond to $$t_{in} = \text{round}((t_{out}-1)/\text{resampling\_rate}),$$

where $t_{out}$ corresponds to a position of the second filtered sample in the block of subsequent filtered samples. Embodiments may adapt a filter structure such that the filtered input samples from the optical signal are considered based on the resampling rate and/or to a number of taps or filter coefficients considered in the individual filters of the filter structure.

In embodiments that apparatus may be operable to filter the digitized samples of the optical signal using one or more butterfly filter structures. The apparatus may be operable to filter the digitized samples of the optical signal using one or more finite impulse response filter structures. Embodiments may enable an efficient filter structures for digitized samples of the optical signal. Furthermore, the apparatus may be operable to synchronize the digitized samples to a symbol stream of the optical signal at the first sampling rate. The apparatus may be operable to synchronize the digitized samples based on a clock recovery within the digitized samples at the first sampling rate.

In some embodiments the apparatus may be operable to reduce a chromatic dispersion in the digitized samples of the optical signal at the first sampling rate and/or the apparatus may be operable to digitize an optical-electrical converted analog signal to obtain the digitized samples at the first sampling rate. Embodiments may provide an efficient concept for baseband processing of an optical signal.

Embodiments provide a method for a receiver of an optical signal. The method comprises inputting digitized samples of the optical signal at a first sampling rate. The method further comprises filtering the digitized samples based on a plurality of filter coefficients to obtain filtered samples of the optical signal at a second sampling rate. The second sampling rate is different from the first sampling rate. The method further comprises outputting the filtered samples of the optical signal at the second sampling rate.

Embodiments further provide a computer program having a program code for performing one or more of the above described methods, when the computer program is executed on a computer or processor. A further embodiment is a computer readable storage medium storing instructions which, when executed by a computer, cause the computer to implement one of the methods described herein.

BRIEF DESCRIPTION OF THE FIGURES

Some other features or aspects will be described using the following non-limiting embodiments of apparatuses or methods or computer programs or computer program products by way of example only, and with reference to the accompanying figures, in which

FIG. 12 illustrates a table of possible values of re-sampling rates;

DESCRIPTION OF EMBODIMENTS

Various example embodiments will now be described more fully with reference to the accompanying drawings in which some example embodiments are illustrated. In the figures, the thicknesses of lines, layers or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
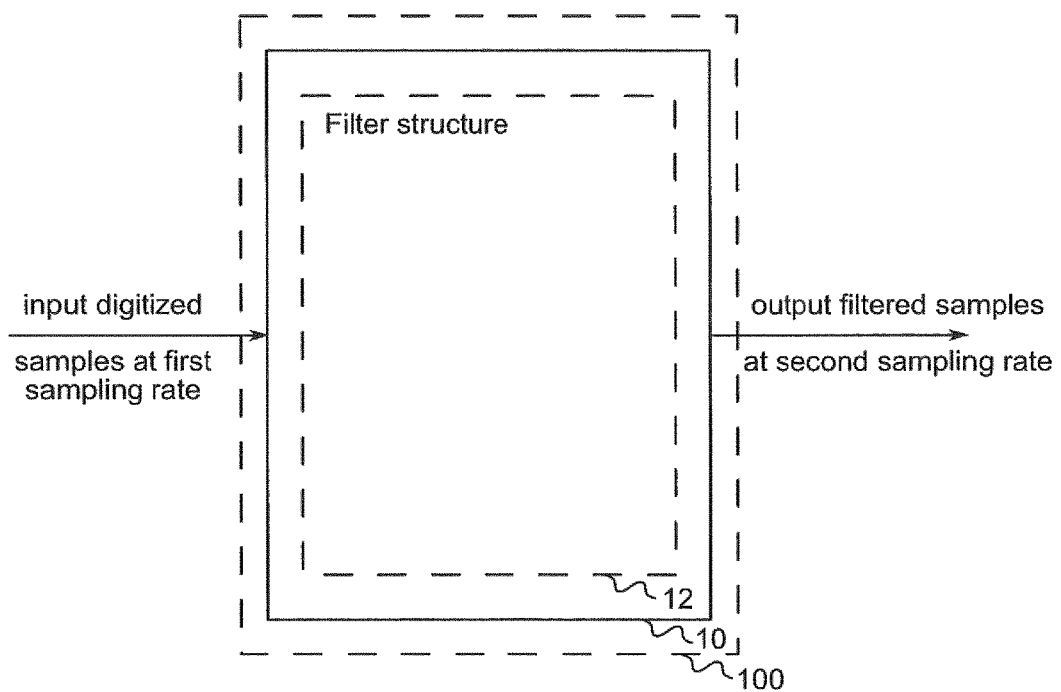
FIG. 1 illustrates a block diagram of an embodiment of an apparatus for a receiver.

In the following some embodiments of apparatuses, methods and computer programs for an optical receiver will be described. FIG. 1 illustrates a block diagram of an embodiment of an apparatus 10 for a receiver 100. In other words, the apparatus 10 may be adapted to or operable in a receiver 100; it may be operated by or comprised in a receiver 100. Embodiments may also provide a receiver 100 comprising the apparatus 10. FIG. 1 further shows an embodiment (dashed lines) of a receiver 100 comprising the apparatus 10.

The apparatus 10 is operable to input digitized samples of the optical signal at the first sampling rate. The apparatus 10 is further operable to filter the digitized samples based on a plurality of filter coefficients to obtain filtered samples of the optical signal at the second sampling rate. The second sampling rate is different from the first sampling rate. The apparatus 10 is further operable to output the filtered samples of the optical signal at the second sampling rate. In embodiments the apparatus 10 may be implemented as one or more processing units, one or more processing devices, one or more processing modules, any means for processing, etc. In some embodiments the apparatus 10 may correspond to digital processing means, for example, a processor. In other words, the apparatus 10 may be implemented as software being executed on accordingly adapted programmable hardware. In other embodiments the apparatus 10 may correspond to processing hardware, adapted to carry out the processing described herein. In some embodiments the apparatus 10 may correspond to a processor, a controller, a Digital Signal Processor (DSP), etc.

The receiver 100 may comprise further components as will be detailed subsequently. It is to be noted, that the receiver 100 may be implemented as digital processing means, with different processing modules, such as software modules. For example, one of the algorithms included in such a processing means, such as a DSP in a coherent receiver 100, may be an adaptive butterfly equalizer updated by a Constant Modulus Algorithm (CMA).

FIG. 1 further illustrates an optional filter structure 12, which may correspond to such a butterfly equalizer using a CMA. In embodiments the filter structure 12 may provide multiple features, such as equalization, polarization demultiplexing, Polarization Mode Dispersion (PMD) compensation, residual chromatic dispersion compensation and/or retiming. In the following it is assumed that such algorithms operate on an input signal with a sampling frequency higher than a symbol rate, for example, equal to two times the symbol rate, which may also be expressed as two samples per symbol (2 Sps). Embodiments may enable a reduction of the number of samples per symbol further allowing a reduction in the power consumption of the receiver 100, for example, in an Analog-to-Digital Converter (ADC) part and in the Chromatic Dispersion Compensation (CD comp) part. Some embodiments may therefore operate, for example, at 1.5 Sps. Embodiments may therefore provide the apparatus 10 to re-sample the symbol rates, which may also include a CMA for reduced samples per symbol.

Figure 2:
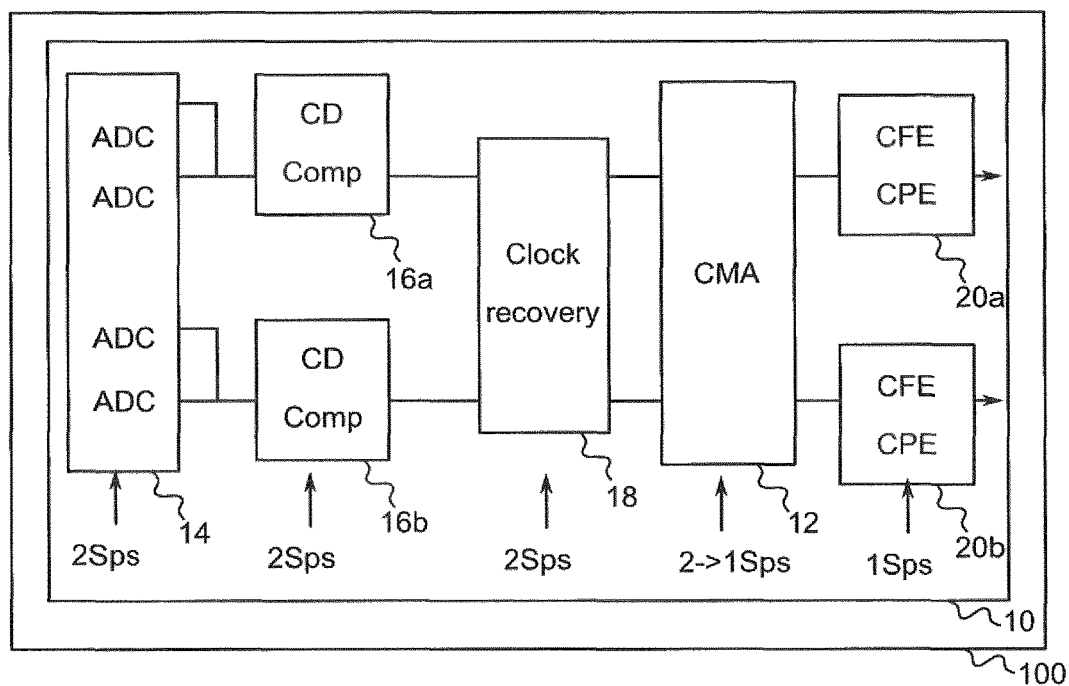
FIG. 2 shows a block diagram of an embodiment of a receiver for an optical signal.

FIG. 2 illustrates an optical receiver 100 in an embodiment, which will be used to illustrate at least some of the possible components in the processing chain of an optical receiver 100. Underneath the components of FIG. 2 the corresponding sampling rates are provided in Sps. FIG. 2 shows a receiver 100 comprising an apparatus 10. In the present embodiment it is assumed that the receiver 100 and the apparatus 10 receive an electrical signal, which corresponds to an analog baseband representation of the optical signal. As known in the art, the optical receiver 100 may comprise further components, such as an optical element, for example a photo diode or a photo transistor, to receive an optical signal and to convert the optical signal to an electrical signal. Moreover, the receiver 100, the apparatus 10, respectively, may comprise further components, such as an amplifier, for example a Low-Noise Amplifier (LNA), or filter circuitry, for example bandpass filters, a mixer or down-converter etc. As shown in FIG. 2 the analog electrical signal is provided to one or more ADCs 14, which convert the analog electrical signal into a digital electrical signal. In other words in the embodiment shown in FIG. 2 the apparatus 10 comprises ADCs 14, that is to say that the apparatus

10 is operable to digitize an optical-electrical converted analog signal to obtain digitized samples at the first sampling rate.

In the present embodiment the first sampling rate is assumed to be 2 Sps. As further shown in FIG. 2 there are two signal processing branches, one at the top and one at the bottom. In general multiple branches may be used to process different modes or polarizations of the optical signal. In other words, the apparatus 10 may be operable to input multiple parallel streams of digitized samples with the first sampling rate based on multiple polarizations and/or multiple modes of the optical signal. In some embodiments the apparatus 10 may be further operable to de-multiplex samples of different polarizations and/or different modes of the optical signal using the plurality of filter coefficients, as will be detailed subsequently. As shown in FIG. 2 the digitized samples are provided to two chromatic dispersion compensation units 16a and 16b, which are coupled to the ADCs 14, at the first sampling rate. In other words the two chromatic dispersion compensation units 16a and 16b may correspond to filter circuitry or filter components, which compensate for chromatic dispersion which may have occurred in the optical signal, for example, evoked by communication through an optic fiber, such as a single or multi-mode fiber.

As shown in FIG. 2 the two units 16a and 16b operate at the first sampling rate. The compensated digital samples are then provided to a clock recovery unit 18 also at the first sampling rate, which recovers a clock frequency from the digital samples and which is coupled to the units 16a and 16b. In the present embodiment it is assumed that the clock recovery 18 recovers a carrier frequency of the digitized samples. In some embodiments such carrier frequency may be exact, but the phase alignment of the digitized samples and the actual symbols in the optical signal may not yet be achieved. Such synchronization may be achieved in the clock recovery block 18 or in the subsequent CMA block 12, e.g. by means of fractional delays introduced by filters. In the subsequent CMA block 12, which is coupled to the clock recovery 18, resampling may occur from the first sampling rate to the second sampling rate, from 2 Sps to 1 Sps in the present embodiment. As will be further described subsequently, the CMA 12 may comprise one or more filter structures, to carry out multiple functions or processing features. After the resampling to the second sampling rate, in each branch there are blocks couple to the CMA 12, which carry out Carrier Frequency Estimation and correction (CFE) and Carrier Phase Estimation and correction (CPE) 20a and 20b. These processing blocks may operate at the second sampling frequency (1 Sps) and may perform carrier and phase estimation as well as carrier and phase compensation or correction. For example, offset corrections may be carried out.

As has been mentioned above some of the described components in FIG. 2 may be implemented by means of a DSP and corresponding software modules. The CMA filter structure 12 may comprise means to reduce the sampling rate from the first sampling rate to the second sampling rate. In the present embodiment the second sampling rate is lower than the first sampling rate. In further embodiments, a ratio of the first sampling rate to the second sampling rate differs from an integer. In other words, different from the ratio in the present embodiment 2 Sps/1 Sps=2, such ratio may not be an integer, but correspond to real or rational numbers, for example 1.5 Sps/1 Sps=1.5.

In embodiments the CMA block 12 may comprise a set of butterfly filters, for example, an extension of a single 4-Finit Impulse Response (FIR) based butterfly filter bank of a standard CMA. The CMA 12 may further comprise a set of independent adaptive update functions, which can be based on CMA. The CMA 12 may further comprise an element for a correct initialization of the filters of a block of samples in order to avoid catastrophic events. That is to say that the apparatus 10 may be operable to adaptively update the filter coefficients applied in CMA 12. For example, the filter coefficients may be updated based on a constant or multi-modulus algorithm such as CMA, MMA etc. Furthermore, at least in some embodiments, the apparatus 10 may be operable to initialize the filter coefficients based on a CMA or MMA. Subsequently, it will be explained how these elements may be operated in order to enable processing features of a CMA block, which may operate on input signals with arbitrary sample rates. For example, filter updates may be done by an MMA for 8/16 or 64 QAM samples.

Figure 3:
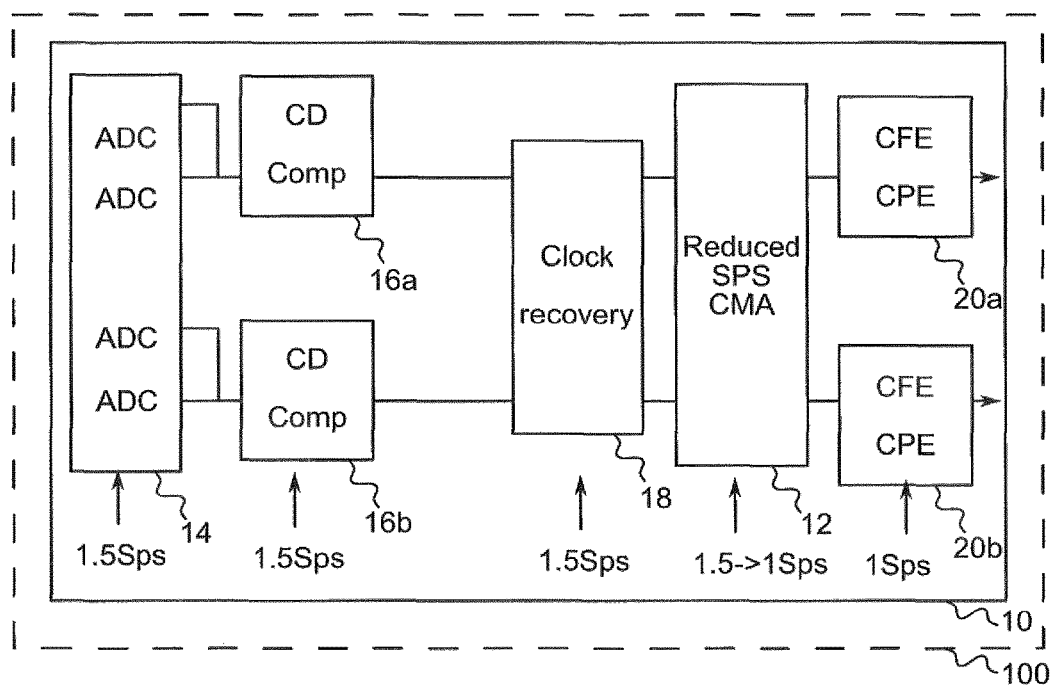
FIG. 3 shows a block diagram of another embodiment of a receiver for an optical signal.

FIG. 3 shows a block diagram of an embodiment of a receiver 100 for an optical signal. In the embodiment of FIG. 3 an ADC/DSP operating at 1.5 Sps uses a Reduced SPS CMA 12 and down-samples from 1.5 Sps to 1 Sps. The embodiment of FIG. 3 shows similar components as the embodiment of FIG. 2, except that the first sampling rate is 1.5 Sps and the second sampling rate is 1 Sps. With respect to the features or functions of the components it is referred to the description of FIG. 2. In the embodiment depicted in FIG. 3 the input signal comprises samples at 1.5 Sps as the first sampling rate. In a possible implementation a DSP would be operating at 1.5 Sps. In that case the ADCs 14 are sampling at 1.5 Sps and the other components or DSP blocks between the chromatic dispersion compensation 16a, 16b and reduced SPS CMA 12 are also operating at the first sampling rate 1.5 Sps. The implementation of these blocks, for example, the chromatic dispersion compensation blocks 16a, 16b and the clock recovery 18, at 1.5 Sps can be considered as a variation of what was described in FIG. 2 for a sampling rate of 2 Sps. The filter structure 12 or reduced SPS CMA 12 carries out resampling in the present embodiment. Its input signal is at the first sampling rate of 1.5 Sps and the output signal is at the second sampling rate of 1 Sps. In some embodiments the reduced SPS CMA 12 of the apparatus 10 may perform further signal processing or signal operations, such as polarization de-multiplexing of multiple polarizations of the optical signal, equalization, retiming and down-sampling. These operations may be performed at once or sequentially with the re-sampling.

Figure 4:
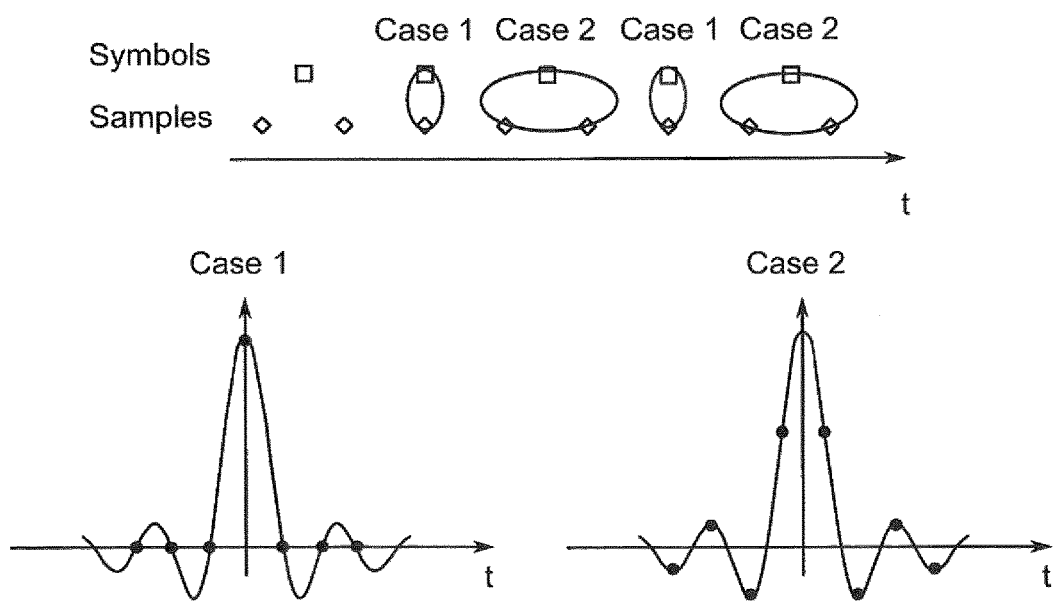
FIG. 4 illustrates a processing example of an embodiment.

FIG. 4 illustrates a processing example of the embodiment as shown in FIG. 3. FIG. 4 shows a timeline at the top, for which odd output samples (Case 1) and even output samples (Case 2) are illustrated. The symbols depicted by the square-shaped markers represent the filtered samples of the optical signal at the second sampling rate of 1 Sps. Underneath the square-shaped markers there is a series of diamond-shaped markers representing the digitized samples of the optical signal at the first sampling rate of 1.5 Sps. FIG. 4 illustrates a simplified representation of the temporal alignment between input samples (diamond shape) and output symbols (square shape). Moreover, it is assumed that some sort of synchronization, as far as clock recovery 18 and fractional delay goes, has already been achieved. The output symbols may be considered part of two distinct sets, even and odd. The odd output symbols are those aligned with an input sample. The even output symbols are those falling in the middle between two input samples at the top of FIG. 4. For simplicity reasons, if the need for polarization de-multiplexing equalization and retiming is neglected, then the even output symbols may require a fractional delay of 0.5 symbol durations, normalized to the sampling rate of the input signal, i.e. the first sampling rate of 1.5 Sps.

In this sense it can be imagined that both odd and even output symbols pass through fractional delay filters, which for the sake of simplicity, can be based on truncated sinc-functions. These sinc-functions are depicted at the bottom of FIG. 4 for Case 1 (odd) and Case 2 (even) output symbols. The filter for the odd output symbols will be the sinc sampled at integer values, which are 0 everywhere apart from t=0. The filter for the odd output symbols may therefore also be considered as a simple Dirac impulse or delta function. For the even output symbols (Case 2) the output symbols may be sampled at $$t=-3.5,-2.5,-1.5,-0.5,0.5,1.5,2.5,3.5$$

in the example depicted in FIG. 4.

In other words FIG. 4 shows a representation of the two possible cases for even and odd symbols. In case 1, the odd symbols are time-aligned with a corresponding sample in the input signal, and in case 2, the even symbols are in the middle between two samples of the input signal. The use of a timing interpolator with appropriate values for even and odd sets of symbols may provide a retiming function required by both even and odd sets of output symbols. As illustrated in FIG. 4 different filtering functions may be used for odd and even symbols. For example, four FIR filters may be used in a butterfly structure for odd symbols and four different FIR filters may be used in a butterfly structure for the even output symbols, as illustrated in the subsequent Figs.

Figure 5:
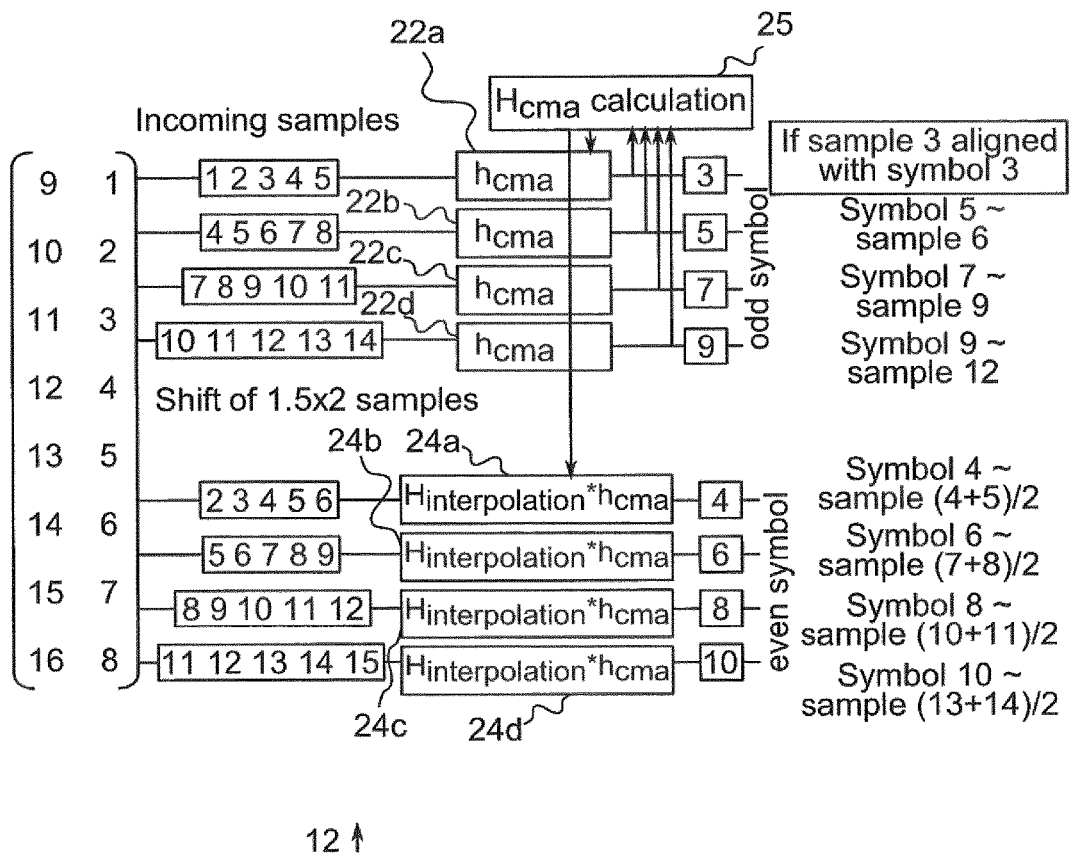
FIG. 5 shows an example of a filter structure in an embodiment.

FIG. 5 shows an example of a filter structure 12 in an embodiment. In the embodiment depicted in FIG. 5 multiple parallel input streams of digitized samples with the first sampling rate, which may be based on multiple polarizations and/or multiple modes of the optical signal, are filtered. Correspondingly, multiple output filtered digitized samples are provided by the embodiment. As further shown in FIG. 5 the apparatus 10 with the filter structure 12 is operable to filter the digitized samples using a structure of multiple parallel filters 22a, 22b, 22c, 22d for the odd output samples (transfer functions $h_{CMA}$) and 24a, 24b, 24c, 24d for the even output filtered samples (transfer functions $H_{interpolation}*h_{CMA}$). The filters as shown in the embodiment depicted in FIG. 5 are in a parallel FIR structure.

Each of the multiple parallel filters 22a-d and 24a-d is operable to output filtered samples, based on incoming input samples. For example, filter 2a determines output sample 3 based on input samples 1, 2, 3, 4, and 5, filter 24d determines output sample 10 based on input samples 11, 12, 13, 14, and 15, etc. as shown in FIG. 5. Moreover, it can be seen from the numbering of the input samples for the respective filters 22a-d and 24a-d that there is a shift of 1.5×2 samples between two consecutive odd or even filters 22a-d and 24a-d. In other words in FIG. 5 a parallelism factor of 8 and a five tap CMA is shown. A sample output rate of one of the multiple parallel filters 22a-d, 24a-d is lower than the second sampling rate, as their outputs are combined and the overall output rate of all filters may then correspond to the second sampling rate.

In the present embodiment it is hence assumed that the first sampling rate corresponds to 1.5 Sps and that the second sampling rate corresponds to 1 Sps. In other words, there are 3 input samples for each 2 output samples. If it is further assumed that the output sample 3 is timely aligned or synchronized with symbol 3, then it can further be assumed that symbols 5, 7, and 9, are correspondingly aligned with samples 6, 9, and 12, as given in the table on the right of FIG. 5. Furthermore, interpolation is used to determine the even samples, which is indicated by the transfer functions $H_{interpolation}$, which are convoluted with the corresponding filter transfer functions $h_{CMA}$. The even output samples are based on an interpolation and filtering as it is indicated in the lower part of the table on the right hand side of FIG. 5. For example, output symbol 4 is based on input samples 4 and 5; output symbol 10 is based on input samples 13 and 14, etc. FIG. 5 further illustrates the calculation module 25 of the transfer functions, which is based on a constant modulo algorithm in the present embodiment.

Figure 6:
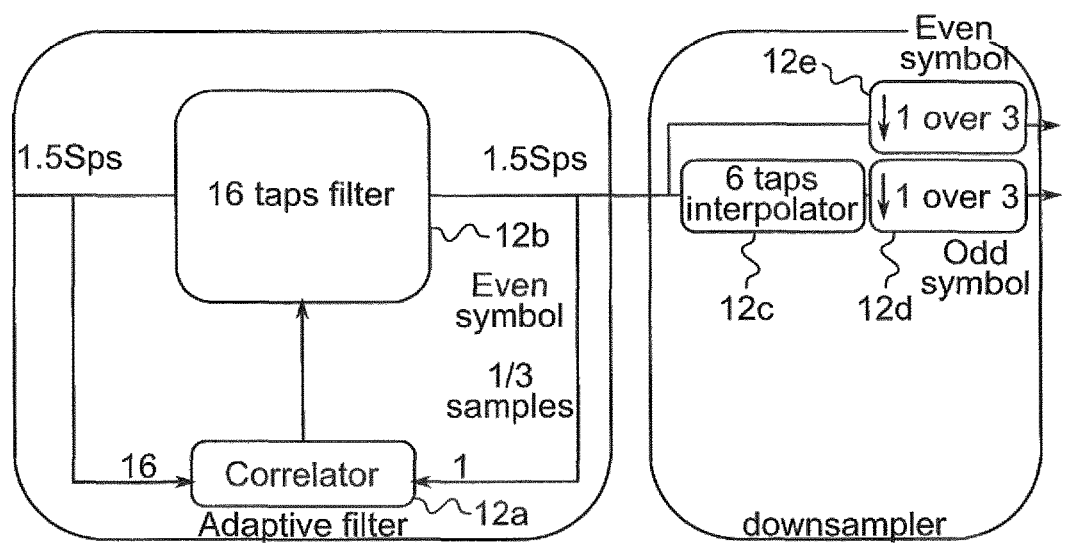
FIG. 6 illustrates a processing example with an adaptive filter in the time domain in an embodiment.

In the following embodiment, the apparatus 10, the reduced SPS CMA module 12, respectively, further comprises an adaptive filter 12a, 12b, which is operable to filter the digitized samples at the first sampling rate. FIG. 6 illustrates a processing example with an adaptive filter 12a, 12b in the time domain in an embodiment. The adaptive filter 12a, 12b comprises a correlator 12a and 16-taps filter 12b, which base an updating of coefficients of the adaptive filter 12a, b on a fraction of output samples of the adaptive filter 12a, b. It should be noted that the dimension of the filter 12b using 16-taps is an example dimension, in other embodiments different numbers of taps may be used. In the embodiment depicted in FIG. 6 the 1.5 Sps are assumed at the output of the adaptive filter with a subsequent downsampling to 1 Sps. As shown in FIG. 6 the apparatus 10 further comprises a downsampler with an interpolator (6 taps) 12c and two decimators 12d and 12e. It should be noted that the dimension of 6 taps is only an example value and other dimensions or a different number of taps may be used in other embodiments. For example, an 8-taps interpolator may have a higher accuracy, which may be better for higher order modulation such as 16QAM, 64QAM. The decimator 12e is operable to select samples, which are used for updating the coefficients of the adaptive filter 12a, b as samples of the filtered samples of the optical signal. The apparatus 10 comprises interpolator 12c, which is combined with subsequent decimator 12d (in series), and they are operable to determine other samples of the filtered samples of the optical signal. In other words, the components shown in FIG. 6 may illustrate a mode of operation for reduced sampling rate operation in an embodiment.

As shown in FIG. 6, the module 12 may be (reduced sampling rate CMA) split in two parts, adaptive filter 12a, b and downsampler 12c, d, e. The first part 12a, b operates at a first sampling rate (1.5 sps for example) and is responsible for all the filtering part, for example equalization, polarization demultiplexing, PMD compensation, etc. The second part 12c, d, e is a downsampler changing the sampling rate from the first sampling rate (1.5 sps for example) to the second sampling rate (typically 1 Sps).

The update of the adaptive filter 12a, b is done by using samples corresponding to the center of a symbol. In the case of 1.5 Sps operation in the embodiment shown in FIG. 6, this corresponds to one third of the input samples. These samples (or a fraction of them) are used to update the adaptive filter 12a, b. By using these samples to update the adaptive filter 12a, b, one third of the samples computed by the adaptive filter are automatically (when the adaptive filter 12a, b has successfully converged) time aligned with one half of the symbols. In other words, every third sample of the input samples has a sampling instant equal to a symbol center, more precisely, to every second symbol center. The adaptive filter 12a, b can be realized in time domain or in the frequency domain, for example using Fast Fourier Transformation (FFT) and inverse FFT (iFFT) to reduce DSP complexity.

Figure 7:
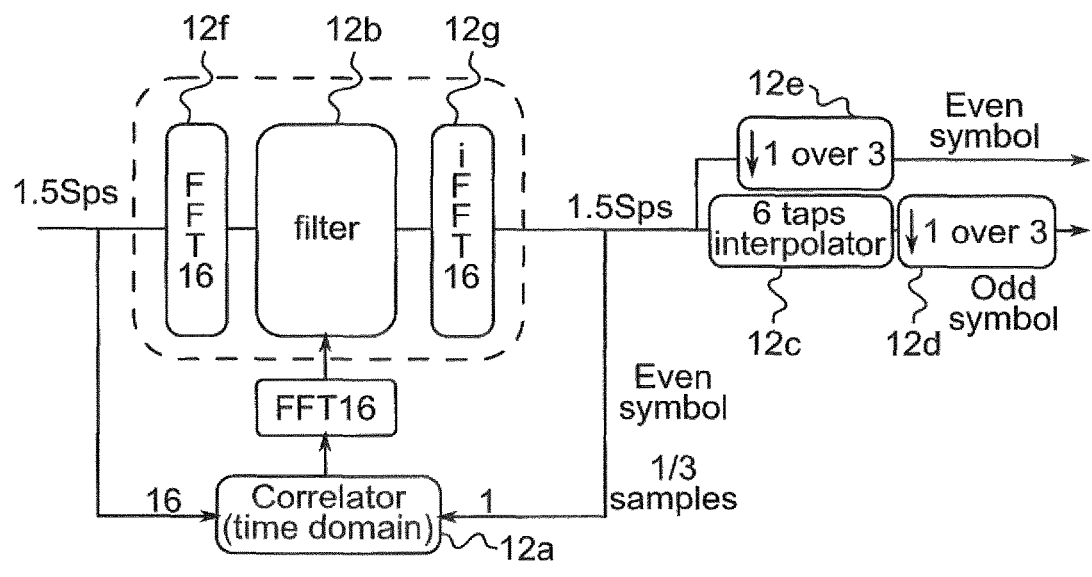
FIG. 7 illustrates a processing example with an adaptive filter in the frequency domain in an embodiment.

FIG. 7 illustrates a processing example with an adaptive filter 12a, b in the frequency domain in another embodiment. FIG. 7 shows a 16-tap FFT 12f to transform the input samples to the frequency domain. It should be noted that FIG. 7 indicates a 16-taps FFT as an example dimension in an embodiment. In further embodiments the FFT size may be much larger, for example 3 to 8 times larger. For example, a standard "overlap and save method" may be used. A FFT with 64 taps may be computed to apply a 16 taps filter. Thus 64−16+1 sample may be correctly computed for each FFT. The next or subsequent FFT may then again compute 64 samples, with a sample shift of 64−16+1 samples. In other words the 16-tap FFT may indicate that 16 taps is the equivalent "filter size", where an actual filter or FFT-size may differ. The FFT size may be significantly larger than the targeted filter size in order to be computationally effective. More details on the dimensioning of the FFT and the "overlap and save method" can be found in J. C. Geyer et al, "Efficient Frequency Domain Chromatic Dispersion Compensation in a Coherent Polmux QPSK-Receiver", Optical Fiber Communication (OFC), collocated National Fiber Optic Engineers Conference (NFOEC), 2010 Conference on (OFC/NFOEC).

The filter 12b operates in the frequency domain and its output samples are then transformed back into the time domain by 16-tap iFFT 12g. The correlator 12a operates in the time domain and the updated filter coefficients are transformed to the frequency domain by the 16-tap FFT 12h before being used in the filter 12b. As explained for the time domain embodiment shown in FIG. 6 every third output sample of the iFFT 12g is assumed to be time-aligned with an even symbol. FIG. 7 further illustrates decimators 12d and 12e and the 6-tap interpolator 12c as discussed above for FIG. 6. The 6-tap interpolator 12c is used to compute the odd symbols. In some embodiments processing capacity or multiplications may be saved as only one third of the output samples at 1.5 Sps may need to be computed and a sample shift of 0.5 samples may be considered.

As shown by the embodiments of FIGS. 6 and 7 output samples at the decimators 12d and 12e correspond to "even symbols" and can be directly used by latter DSP blocks. In order to compute the other symbols, an interpolator is required. The longer the length of the interpolator, the better the computation accuracy may be. A 6 or 8 taps interpolator can be used to compute new samples with sufficient accuracy, which should be shifted by a duration corresponding to half of a first sampling rate duration. One out of three new computed samples corresponds to an odd symbol, which are then forwarded to the next DSP block in combination with the even symbols. It can be noted that sample interpolation and decimation may be done efficiently simultaneously, for example, compute only the right samples corresponding to odd symbols.

Figure 8:
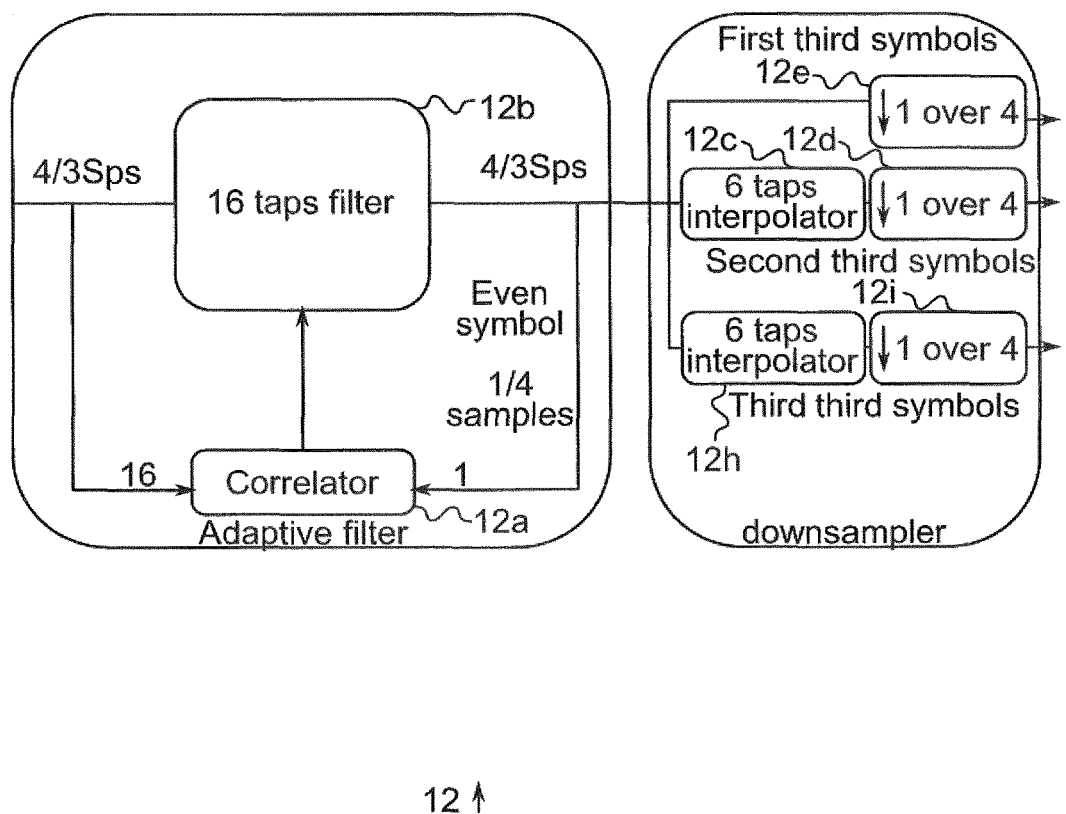
FIG. 8 illustrates another processing example with an adaptive filter in the time domain in an embodiment.

FIG. 8 illustrates another processing example with an adaptive filter in the time domain in an embodiment. The embodiment depicted in FIG. 8 comprises similar components as the embodiments illustrated in the previous Figs. In FIG. 8 a first sampling rate of 4/3 Sps and a second sampling rate of 1 Sps are assumed. The downsampler hence comprises an additional 6-tap interpolator 12h and an additional decimator 12i. As described previously, a similar technique may be applied to various sampling rates, as will be further detailed subsequently with the help of FIG. 12. In the case of 4/3 samples per symbol, one symbol out of 4 computed by the adaptive filter 12a, b corresponds to a symbol or has a sampling time instant equal to a symbol center. These samples (or a fraction of them) are used for the adaptive filter update. One third of the symbols can thus be directly extracted from the adaptive filter 12a, b with a simple decimation 12e. The other two thirds are computed by two separated interpolators 12c, 12h.

In other words, the embodiments show that the apparatus 10 may be operable to filter the digitized samples using a structure composed of an adaptive filter 1a, b operating at the first sampling rate and using a fraction of the output samples (1/p) to update the adaptive filter 12a, 12b. The apparatus 10 may further comprise a downsampler composed of one or more decimators 12c, 12h selecting the sample used for filter update. The downsampler may further comprise one or several (q−1) blocks (12c+12d, 12h+12i) composed of interpolator 12c, 12h and decimator 12d, 12i depending on the ratio of the first and second sampling rates.

Figure 9:
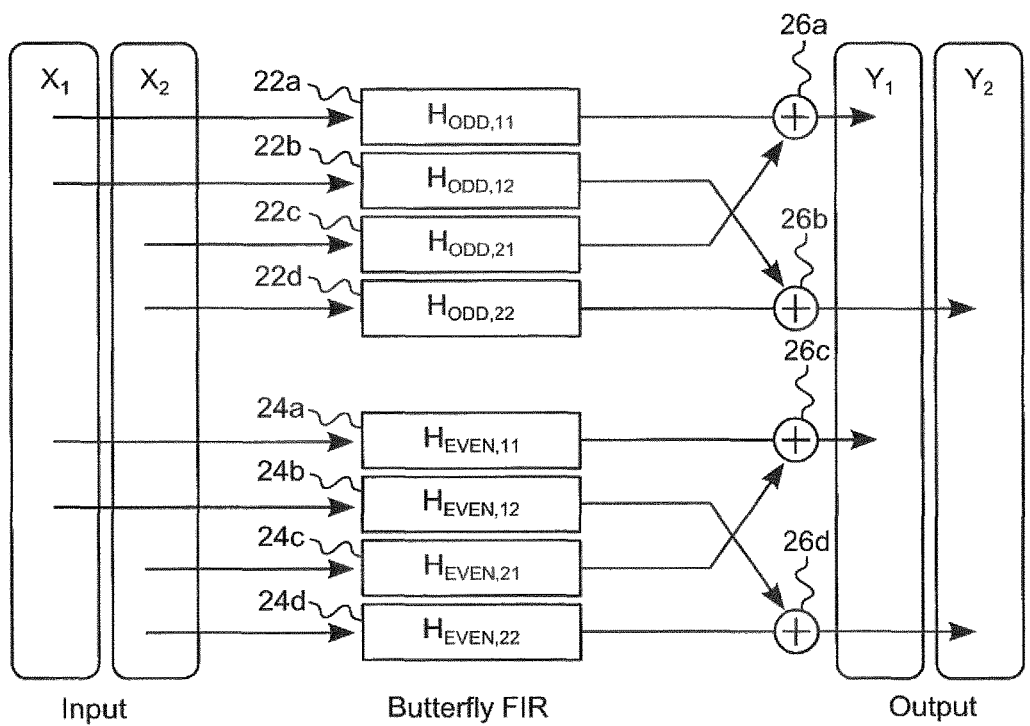
FIG. 9 shows another example of a filter structure in an embodiment.

FIG. 9 shows an example of a filter structure 12 in an embodiment. In the embodiment depicted in FIG. 9 multiple input parallel streams $X_1$, $X_2$ of digitized samples with the first sampling rate, which may be based on multiple polarizations and/or multiple modes of the optical signal, are filtered. Correspondingly, multiple output filtered digitized samples $Y_1$, $Y_2$ are provided by the embodiment. As further shown in FIG. 9 the apparatus 10 with the filter structure 12 is operable to filter the digitized samples using a structure of multiple parallel filters 22a, 22b, 22c, 22d for the odd output samples (transfer functions $H_{ODD,11}$, $H_{ODD,12}$, $H_{ODD,21}$, $H_{ODD,22}$) and 24a, 24b, 24c, 24d for the even output filtered samples (transfer functions $H_{EVEN,11}$, $H_{EVEN,12}$, $H_{EVEN,21}$, $H_{EVEN,22}$). The filters as shown in the embodiment depicted in FIG. 9 are in the known butterfly FIR structure. Each of the multiple parallel filters 22a-d and 24a-d is operable to output filtered samples. A sample output rate of one of the multiple parallel filters 22a-d, 24a-d is lower than the second sampling rate, as their outputs are combined and the overall output rate of all filters may then correspond to the second sampling rate. In the present structure, outputs of filters 22a and 22c are combined indicated by adder 26a to provide a filtered odd output sample Y1. Correspondingly the outputs of filters 22b and 22d are combined by adder 26b to provide a filtered odd output sample for $Y_2$. On the even side output of filters 24a and 24c are combined by adder 26c to provide $Y_1$, the outputs of filters 24b and 24d are combined by adder 26d to provide the even filtered output sample $Y_2$. For example, it can be assumed that $Y_1$ and $Y_2$ correspond to two filtered outputs for different polarizations of the optical signal. As can be seen the upper four branches provide the odd output samples and the lower four branches provide the even output samples. In other words, in this embodiment the filter structure may operate at half of the second sampling rate, as the filter may either provide a contribution to an odd output sample or an even output sample.

As shown in FIG. 9 odd and even output samples are generated by different butterfly filters 22a-d and 24a-d. It may be noted that the filters 22a-22d, 24a-24d may be implemented in a real-time DSP which may work with a reduced clock in a parallel architecture. In such a case there may be several copies of each of the FIR filters 22a-22d, 24a-24d, respectively. For example, there may be as many $H_{11}$ filters (c.f. 22a and 24a in FIG. 9) as the parallelism may require. The different filters may operate on different samples belonging to the same parallel block of data. For the sake of simplicity a partial representation of such a structure may be considered where only one input stream is considered and only one output stream is considered. This simplification may correspond to a case in which only a single polarization is operated. In this case the whole set of four FIR filters in a butterfly structure may reduce to a single element called either $H_{ODD}$ (22a-22d) or $H_{EVEN}$ (24a-24d).

Figure 10:
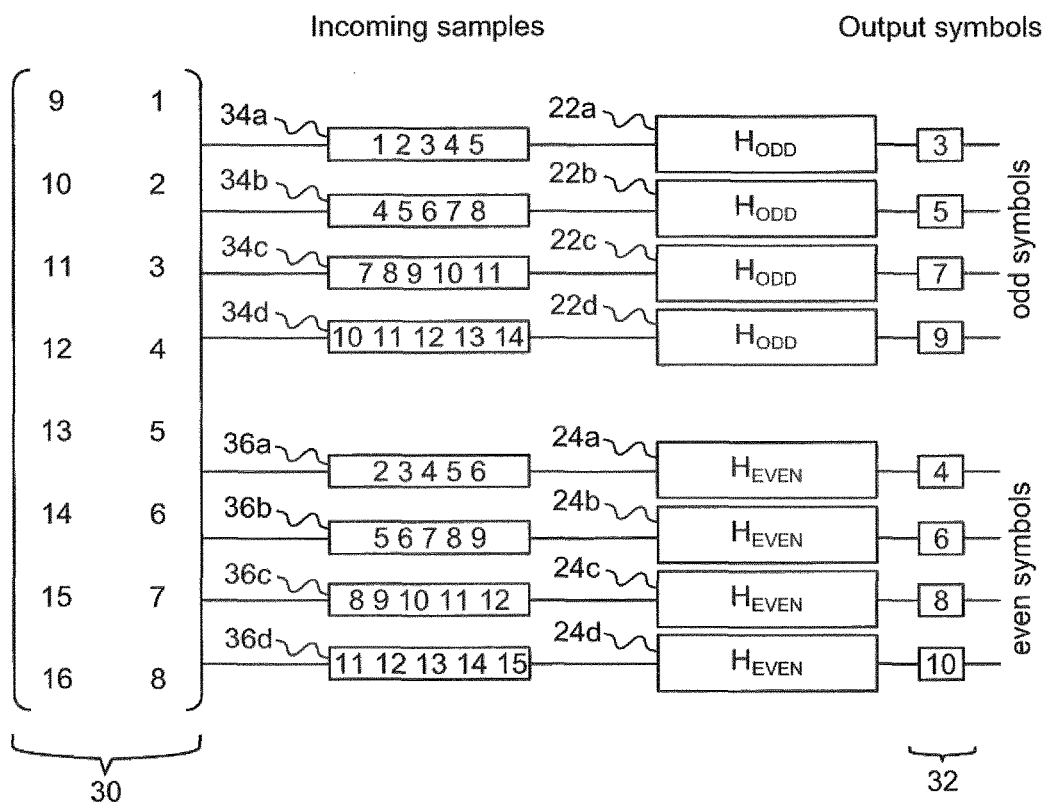
FIG. 10 depicts another example of a filter structure in an embodiment.

FIG. 10 illustrates another example of a filter structure 12 in an embodiment. FIG. 10 shows the filters 22a, 22b, 22c, 22d, 24a, 24b, 24c, 24d as they have been explained with respect to FIG. 9. Moreover, FIG. 10 illustrates a number of input samples 30 and a number of output samples 32. Moreover, FIG. 10 depicts which input samples are considered in which filter. This is done by giving the input sample numbering 34a-d and 36a-d in each branch. That is to say that filter 22a operates on input samples 34a (with timing positions 1, 2, 3, 4, 5 in the block 30 of the input samples), filter 22b operates on input samples 34b (with timing positions 4, 5, 6, 7, 8 in the block 30 of the input samples), and so on. Filter 24a operates based on input samples 36a (with timing positions 2, 3, 4, 5, 6 in the block 30 of the input samples), filter 24b operates based on input samples 36b (with timing positions 5, 6, 7, 8, 9 in the block 30 of the input samples), and so on. The numbers 32 given directly in the branches of FIG. 10 correspond to the timing of the subsequent output symbols within the stream of filtered output samples. For example, filter 22a outputs output sample number 3, filter 24a outputs filtered output sample number 4, filter 22b outputs output filtered sample number 5, and so on.

FIG. 10 illustrates an example of the parallelism of such a filter structure 12. Moreover, the example shown in FIG. 10 assumes a five-tap FIR filter, so five input samples are considered in each of the parallel branches, with a parallelism of 8, so eight output symbols are generated per input block, or per clock time. In other embodiments filters with more taps or less taps may be used in analog manner. The filter structure 12 of FIG. 10 may be implemented on a DSP. Each of the blocks $H_{ODD}$ or $H_{EVEN}$ contains four five-tap FIR filters (22a-d, 24a-d) for generating the corresponding output. As has been mentioned above, the presence of the second polarization in the input and in the output is neglected for the sake of simplicity. In the example shown in FIG. 10, the input signal is assumed to be at the first sampling rate of 1.5 Sps, which is then used to generate the filtered output symbols or samples at the second sampling rate of 1 Sps through two independent series of butterfly filter 22a-d and 24-d. Embodiments provide a method for the correct and consistent update of the even and odd filters used by the structure 12. In some embodiments the filter functions $H_{ODD}$, which corresponds to a number of filter coefficients, may be updated by a CMA, which may be executed on the odd symbols only.

The other filter coefficients $H_{EVEN}$ may be calculated by fractional delay of the $H_{ODD}$ filters. Implementation of such a filter has shown good performance. Nevertheless, there may be a small penalty, for example below 0.5 dB typically, which may be associated to the fractional interpolator, which is visible for large Signal-to-Noise Ratio (SNR). In some embodiments the odd filters 22a-22d $H_{ODD}$ may be updated by a CMA on the odd symbols only. The even filters $H_{EVEN}$ may then be calculated by a fractional delay of the odd filters 22a-22d $H_{ODD}$ in a first phase, for example referred to as the convergence phase. After the convergence phase the even filters 22a-22d $H_{EVEN}$ may be calculated by another CMA, which is executed on the even symbols only. The latter option may present no penalty at all with respect to a 2 Sps processing of the same data. As exemplified in FIG. 4, a typical case for a fractional interpolator may be a truncated sinc-function, a Lagrange interpolator or a windowed truncated sinc-function like the Lanczos fractional delay. It may be noted that the DSP complexity may not be increased by using odd and even filters because of the required parallelism in the DSP, which may be well higher than two. For example, the parallelism may lie between 32 and 256 for a 100G coherent transponder.

Figure 11:
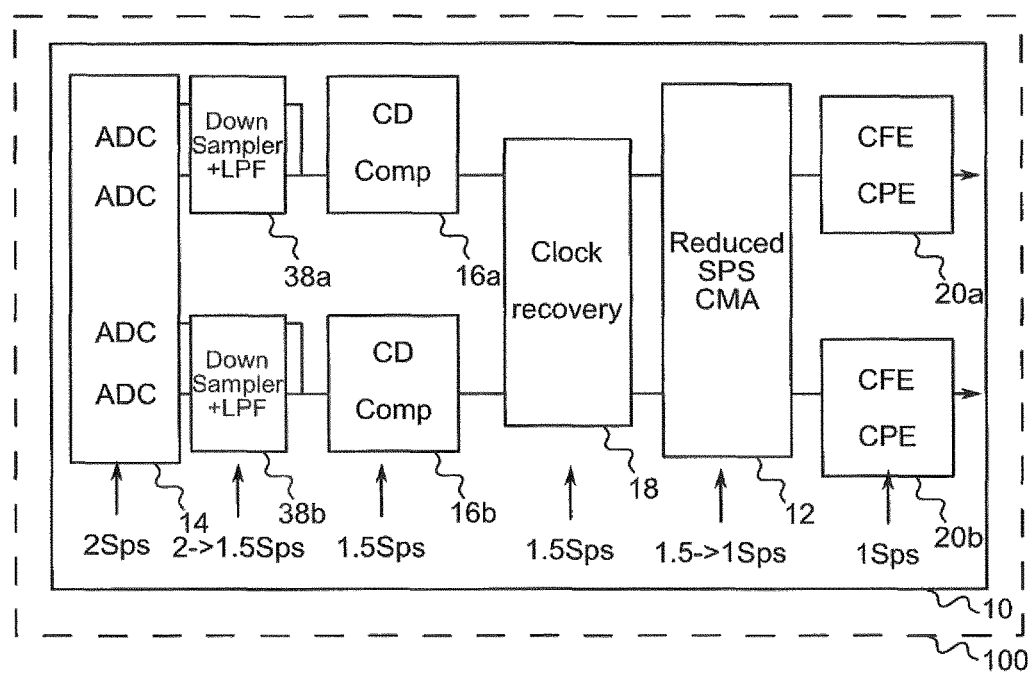
FIG. 11 shows a block diagram of another embodiment of a receiver for an optical signal.

FIG. 11 illustrates a block diagram of another embodiment of a receiver 100 for an optical signal. In the embodiment shown in FIG. 11 a different scheme for the ADC 14 DSP is illustrated using a down-samplers and Low-Pass Filters (LPFs) 38a and 38b. As indicated by the sampling rates given underneath the respective components in FIG. 11, the sampling rate is decreased from 2 Sps to 1.5 Sps by the down-samplers and LPFs 38a and 38b. The other components shown in FIG. 11 have similar functions as described above. In the embodiment shown in FIG. 11 the ADC 14 may still operate at 2 Sps while the DSP operates at 1.5 Sps, which is enabled by initial down-samplers 38a, 38b, including anti-aliasing LPFs. FIG. 11 depicts an alternative scheme with a filter structure 12, which reduces a sampling rate as described above.

As the above described embodiments show, the apparatus 10 may be operable to filter the digitized samples of the optical signal using one or more butterfly filters. The apparatus 10 may be operable to filter the digitized samples of the optical signal using one or more FIR filter structures, where in other embodiments also Infinite Impulse Response (IIR) filters may be used. Furthermore, the apparatus 10 may be operable to synchronize the digitized samples to a symbol stream of the optical signal at the first sampling rate. This is illustrated by the above embodiment where the odd symbols of the output stream are already aligned to symbols of the input stream. Some sort of synchronization is also present with respect to the even samples, as they lie between two samples of the input stream and the above example. In embodiments the apparatus 10 may be operable to synchronize the digitized samples based on a clock recovery 18 within the digitized samples at the first sampling rate.

In other words a clock recovery 18 or a recovered clock signal may be used to provide a basis for synchronization, where fractional delay or phase correction may be carried out by the filter structure or Reduced SPS CMA 12. Moreover, the apparatus 10 may be operable to reduce a chromatic dispersion in the digitized samples of the optical signal at the first sampling rate, for example, as explained above using the chromatic dispersion compensation blocks 16a and 16b. In the last embodiment depicted in the FIG. 11, there are actually three sampling rates. The initial sampling rate is 2 Sps, followed by the first sampling rate of 1.5 Sps. Such down-sampling is achieved by the down-samplers 38a and 38b. The chromatic dispersion compensation 16a and 16b will then be operable on the first sampling rate, which already was down-sampled from the initial sampling rate. Furthermore, the apparatus 10 may be operable to digitize an optical-electrical converted analog signal to obtain the digitized samples of the first sampling rate, for example, by means of the ADC 14 as described above. In some embodiments the apparatus 10 may further comprise a down-sampler 38a, 38b, to obtain the digitized samples at the first sampling rate based on digital samples at an initial sampling rate.

In the following embodiment a more general case with arbitrary sampling rates will be considered. For example X samples are considered per symbol in the input signal. In other words the input signal comprises X samples per output symbol. For example a fractional delay related to X may be translated in a fractional number X=p/q. FIG. 12 illustrates an example table of possible values for the sampling rate of the input signal or the digitized samples of the optical signal versus the p/q ratio. The ratio p/q may provide key information for the implementation of an embodiment of a re-sampling method. In more simple words, there are p input samples for each q output symbols or samples. This statement may express a need for q different butterfly structures in the filter structure 12. Each butterfly structure may be updated either by an interpolator or by an independent CMA after a convergence phase based on one or more interpolators. The number of interpolators may be q−1, since the first line of filters may be updated with CMA.

In an embodiment it may be useful to have clear rules regarding which input samples are needed for each of the butterfly structures especially when the number of structures is large. Moreover, embodiments may enable to provide a correct fractional delay for each of the interpolators and may consider that the reference filters are the ones in the first butterfly structure. In other words, in embodiments there may be at least two filtered output samples of two of the multiple parallel filters 12, and the two filtered output samples of the two multiple parallel filters may be time-shifted by a delay. The delay may be based on a relation between the first and the second sampling rates, for example, to p/q. In some embodiments the multiple parallel filters 22a-22d, 24a-24d are operable to process a block subsequent digitized samples of the optical signal, which is illustrated in the FIG. 10 by the sixteen input samples 30. In the embodiment in FIG. 10 the output of the filters 22a-d is a block 32 of output samples. FIG. 10 already illustrates that for sixteen input samples there are eight output samples and hence p/q=2. In this embodiment the multiple parallel filters 22a-d, 24a-d are operable to process a block 30 of subsequent digitized samples of the optical signal. A first filter 22a, 24a of the two of the multiple parallel filters 22a-d, 24a-d corresponds to a reference filter outputting a first filtered sample in a block of subsequent filtered samples 32 having the second sampling rate and corresponding to the block of subsequent digitized samples of the optical signal 30.

A second filter 22b-d of the two of the multiple parallel filters 22a-d, 24a-d corresponds to a filter outputting a second filtered sample. It is assumed that the second filtered sample is $k_{interp}$ samples after the first filtered sample in the block 32 of subsequent filtered samples. The delay is determined relative to a timing of an earliest input sample 34a-d, 36a-d from the block 30 of subsequent digitized samples of the optical signal, which is used by the second filter 22b-d, 24b-d of the multiple parallel filters 22a-d, 24a-d. The timing is delayed by $$d_{interp}(k_{interp}) \times (k_{interp})/\text{resampling\_rate} - \text{round}((k_{interp})/\text{resampling\_rate}),$$

where $d_{interp}$ corresponds to the delay between the timing of the earliest input sample 34a-d, 36a-d and the output of the second filtered sample. The resampling rate corresponds to a ratio of the first and second sampling rates. In the general case $d_{interp}(k_{interp})$ may correspond to the delay normalized to the input sampling rate for the $k_{interp}$-th fractional delay interpolator at resampling a rate of q/p if the output is at 1 Sps.

The input samples for each set of filters 22a-d, 24a-d may be determined by $$t_{in} = \text{round}((t_{out}-1)/\text{resampling\_rate}).$$

In other words, a position $t_{in}$ of the earliest input sample 34a-d, 36a-d in the block 30 of subsequent digital samples used by the second filter 22b-d, 24b-d of the multiple parallel filters 22a-d, 24a-d may correspond to the above equation. $t_{out}$ may correspond to a position of the second filtered sample in the block 32 of subsequent filtered samples. In other words $t_{out}$ may be the index of the output symbol and $t_{in}$ may be the index of the first input sample. Then there may be as many samples in each filter 22a-d, 24a-d as there are taps in the respective filter 22a-d, 24a-d. In some embodiments $t_{out} = k_{interp}+1$.

For example in a seven-tap filter in a 1.6 Sps input signal (p=8; q=5) there are the input samples in each filter:
q=0:
  0 1 2 3 4 5 6 (no interpolator, this is the reference case)
q=1:
  2 3 4 5 6 7 8 (interpolator with fractional delay d=−0.4)
q=2:
  3 4 5 6 7 8 9 (interpolator with fractional delay d=+0.2)
q=3:
  5 6 7 8 9 10 11 (interpolator with fractional delay d=−0.2)
q=4:
  6 7 8 9 10 11 12 (interpolator with fractional delay d=+0.4)
q=0 (next parallel line):
  8 9 10 11 12 13 14 (no interpolator, this is the reference case)

Is should be noted that in embodiments a CMA algorithm may be used to update the filter coefficients based on a specific error function, which may be of low complexity. For example, the error $\varepsilon = M - \text{abs}(Y)^2$, where M is a constant modulus, typically M=1, and Y is the output symbol on a given output of the butterfly filters, may be used. The embodiments presented above may be applied even to variations of the CMA, which may be known algorithms with different error functions. There are algorithms like the Multi-Modulus Algorithm (MMA) that may use a threshold for Y in the error function an associate Y to a given region. Then for each region k there may be a specific value for the constant modulus $M_k$.

Figure 13:
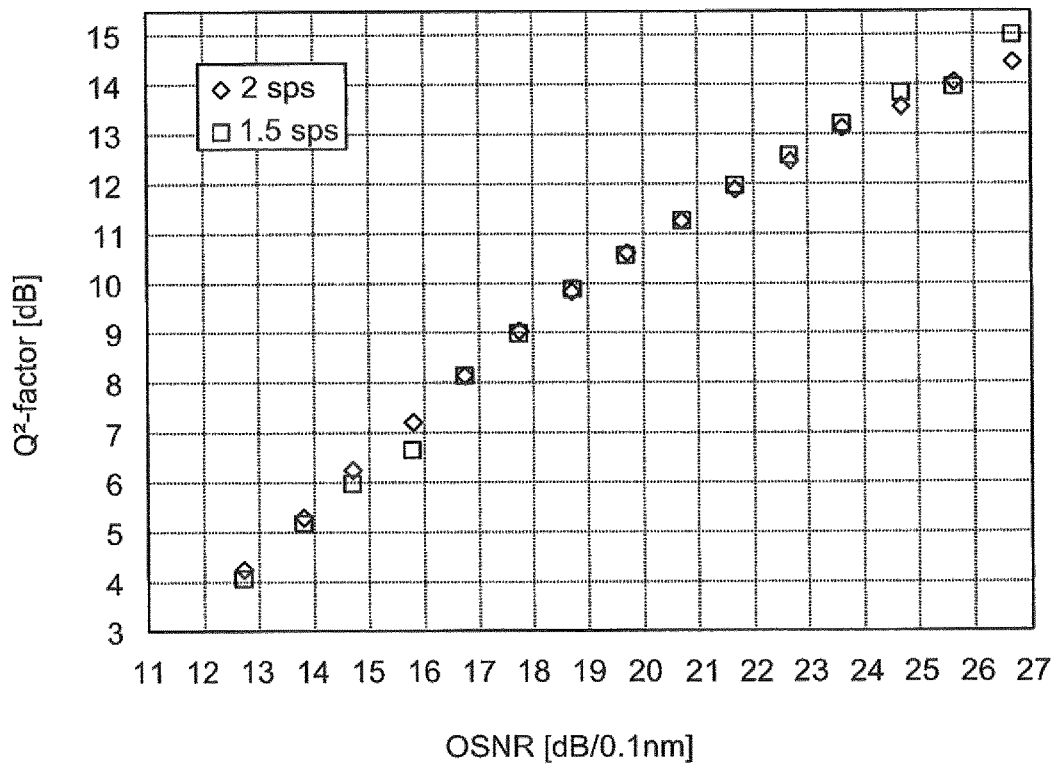
FIG. 13 illustrates simulation results of Q-factor versus optical signal-to-noise-ratio.

In the following, some processing results of a series of waveforms corresponding to an experiment based on a 28 GBd PDM-8QAM signal will be presented with the help of FIG. 13. FIG. 13 shows simulation results displaying the $q^2$ factor in dB over the Optical Signal to Noise Ratio (OSNR) in dB/0.1 nm. The $q^2$ factor is considered as a measure for the eye-opening in optical data detection. As shown in FIG. 13 simulation results obtained at 2 Sps are indicated by diamond-shaped markers and simulation results obtained at 1.5 Sps are indicated by square-shaped markers. To obtain the results shown in FIG. 13 around 140 waveforms have been processed with 2 MBytes data each at different signal-to-noise ratios. Two samples per symbol have been processed with the MMA algorithm and then processed at 1.5 samples per symbol with a reduced sampling rate version of the MMA following the above embodiments. As can be seen from FIG. 13 the obtained results at 1.5 Sps and 2 Sps are almost identical.

Embodiments may permit to operate with reduced sampling rate in order to reduce the power consumption of, for example, ADC 14 and the chromatic dispersion compensation filters 16a and 16b. A power reduction in the range of 25% may be achieved when reducing the sampling rate from 2 to 1 Sps. For example, as 65 Gsamples per second ADC, DSP, and Digital-to-Analog Converters (DAC) may be used for 43 GBaud signals instead of requiring 86 GSamples/s. This may lead to a reduced power consumption and more reasonable specification for the electronics. The need for higher Baud-rate may be simple to justify as many new modulation formats are introduced operating at different bit-per-symbol rates. Embodiments may provide unique benefits in terms of capacity/reach and may have adapted symbol rates in order to match the client bit rate, which may often be fixed at 100 or 400 Gb/s.

Figure 14:
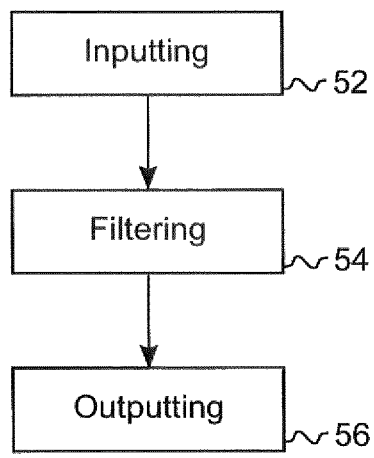
FIG. 14 shows a block diagram of an embodiment of a method for a receiver of an optical signal.

FIG. 14 shows a block diagram of an embodiment of a method for a receiver 100 of an optical signal. The method comprises inputting 52 digitized samples of the optical signal at a first sampling rate. The method further comprises filtering 54 the digitized samples based on the plurality of filter coefficients to obtain filtered samples of the optical signal at a second sampling rate. The second sampling rate is different from the first sampling rate. The method further comprises outputting 56 the filtered samples of the optical signal at the second sampling rate.

A further embodiment is a computer readable storage medium storing instructions which, when executed by a computer, cause the computer to implement one of the methods described herein. Other embodiments are a computer program or a computer program product having a program code for performing anyone of the above described methods, when the computer program or computer program product is executed on a processor, computer, or programmable hardware.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for processing", etc., may be provided through the use of dedicated hardware, such as "a processor", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It is further to be noted that methods disclosed in the specification or in the claims may be implemented by a device having means for performing each of the respective steps of these methods.

What is claimed is:

1. An apparatus for a receiver of an optical signal being configured to:
   input digitized samples of the optical signal at a first sampling rate;
   filter the digitized samples based on a plurality of filter coefficients to obtain filtered samples of the optical signal at a second sampling rate, the second sampling rate being different from the first sampling rate; and
   output the filtered samples of the optical signal at the second sampling rate;
   wherein the apparatus is further configured to:
   filter, via an adaptive filter, the digitized samples at the first sampling rate;
   base an updating of coefficients of the adaptive filter on a fraction of output samples of the adaptive filter;
   select samples which are used to update the coefficients of the adaptive filter as samples of the filtered samples of the optical signal; and
   determine other samples of the filtered samples of the optical signal.

2. The apparatus of claim 1, wherein the second sampling rate is lower than the first sampling rate and/or wherein a ratio of the first sampling rate to the second rate differs from an integer.

3. The apparatus of claim 1, wherein the apparatus is configured to input multiple parallel streams of digitized samples with the first sampling rate based on multiple polarizations and/or modes of the optical signal, and wherein the apparatus is further configured to de-multiplex filtered samples of different polarizations and/or modes of the optical signal using the plurality of filter coefficients.

4. The apparatus of claim 1, wherein the apparatus is configured to synchronize the digitized samples to a symbol stream of the optical signal at the first sampling rate, and/or wherein the apparatus is configured to synchronize the digitized samples based on a clock recovery within the digitized samples at the first sampling rate.

5. The apparatus of claim 1, wherein the apparatus is configured to reduce a chromatic dispersion in the digitized samples of the optical signal at the first sampling rate, and/or wherein the apparatus is configured to digitize an optical-electrical converted analog signal to obtain the digitized samples at the first sampling rate.

6. An apparatus for a receiver of an optical signal being configured to:
input digitized samples of the optical signal at a first sampling rate;
filter the digitized samples based on a plurality of filter coefficients to obtain filtered samples of the optical signal at a second sampling rate, the second sampling rate being different from the first sampling rate; and
output the filtered samples of the optical signal at the second sampling rate;
further comprising an adaptive filter configured to filter the digitized samples at the first sampling rate, wherein the apparatus is configured to base an updating of coefficients of the adaptive filter on a fraction of output samples of the adaptive filter, and wherein the apparatus further comprises a decimator configured to select samples, which are used to update the coefficients of the adaptive filter as samples of the filtered samples of the optical signal, and wherein the apparatus further comprises one or more interpolators combined with subsequent decimators configured to determine other samples of the filtered samples of the optical signal.

7. An apparatus for a receiver of an optical signal being configured to:
input digitized samples of the optical signal at a first sampling rate;
filter the digitized samples based on a plurality of filter coefficients to obtain filtered samples of the optical signal at a second sampling rate, the second sampling rate being different from the first sampling rate;
output the filtered samples of the optical signal at the second sampling rate; and
filter the digitized samples using a structure of multiple parallel filters, each of the multiple parallel filters being configured to output filtered samples, and wherein a sample output rate of one of the multiple parallel filters is lower than the second sampling rate;
wherein two filtered output samples of two of the multiple parallel filters are time-shifted by a delay, and wherein the delay is based on a relation between the first and second sampling rates.

8. The apparatus of claim 7, wherein the apparatus is configured to adaptively update the filter coefficients.

9. The apparatus of claim 7, wherein the apparatus is configured to adaptively update or initialize the filter coefficients based on a constant or multi modulus algorithm.

10. The apparatus of claim 7, wherein the multiple parallel filters are configured to process a block of subsequent digitized samples of the optical signal; and wherein a first filter of the two of the multiple parallel filters corresponds to a reference filter outputting a first filtered sample in a block of subsequent filtered samples having the second sampling rate and corresponding to the block of subsequent digitized samples of the optical signal; and wherein a second filter of the two of the multiple parallel filters corresponds to a filter outputting a second filtered sample, $k_{interp}$ samples after the first filtered sample in the block of subsequent filtered samples; and wherein the delay is determined relative to a timing of an earliest input sample from the block of subsequent digitized samples of the optical signal, which is used by the second filter of the multiple parallel filters, said timing being delayed by $$d_{interp}(k_{interp}) = (k_{interp})/\text{resampling\_rate} - \text{round}((k_{interp})/\text{resampling\_rate}); \text{ and}$$

wherein $d_{interp}$ corresponds to the delay of between the timing of the earliest input sample and the output of the second filtered sample; and wherein the resampling-rate corresponds to a ratio of the first and the second sampling rates.

11. The apparatus of claim 10, wherein a position $t_{in}$ of the earliest input sample in the block of subsequent digitized samples used by the second filter of the multiple parallel filters corresponds to $$t_{in} = \text{round}((t_{out} - 1)/\text{resampling\_rate}),$$

wherein $t_{out}$ corresponds to a position of the second filtered sample in the block of subsequent filtered samples.

12. The apparatus of claim 7, wherein the apparatus is configured to filter the digitized samples of the optical signal using one or more butterfly filter structures, and/or wherein the apparatus is configured to filter the digitized samples of the optical signal using one or more finite impulse response filter structures.

13. A method for a receiver of an optical signal, comprising:
inputting digitized samples of the optical signal at a first sampling rate;
filtering the digitized samples based on a plurality of filter coefficients to obtain filtered samples of the optical signal at a second sampling rate, the second sampling rate being different from the first sampling rate;
outputting the filtered samples of the optical signal at the second sampling rate;
filtering, via an adaptive filter, the digitized samples at the first sampling rate;
basing an updating of coefficients of the adaptive filter on a fraction of output samples of the adaptive filter;
selecting samples which are used to update the coefficients of the adaptive filter as samples of the filtered samples of the optical signal; and
determining other samples of the filtered samples of the optical signal.

14. A non-transitory computer-readable medium storing computer executable instructions for performing the method of claim 13.

* * * * *